United States Patent [19]
Brandstätter et al.
[11] 4,078,108
[45] Mar. 7, 1978

[54] ADHESIVE LAYER FOR X-RAY INTENSIFYING SCREENS ON POLYETHYLENE TEREPHTHALATE SUPPORT LAYERS

[75] Inventors: Wilhelm Brandstätter, Munich; Gerhard Haschka, Schrobenhausen; Herbert Heindze, Hohenschaeftlarn, all of Germany

[73] Assignee: AGFA-Gevaert, A.G., Leverkusen, Germany

[21] Appl. No.: 669,286

[22] Filed: Mar. 22, 1976

[30] Foreign Application Priority Data

Mar. 26, 1975 Germany .............................. 2513258

[51] Int. Cl.$^2$ .......................... B32B 5/16; B32B 27/36
[52] U.S. Cl. .................................... 428/480; 156/332; 260/22 R; 260/22 A; 260/75 K; 260/860; 428/323; 428/328; 428/497; 428/913
[58] Field of Search ............... 428/411, 480, 497, 499, 428/323, 913; 250/483, 486; 260/22 R, 16, 22 A, 75 R, 860; 156/332

[56] References Cited

U.S. PATENT DOCUMENTS

| | | | |
|---|---|---|---|
| 3,023,313 | 2/1962 | De La Mater et al. | 250/486 |
| 3,421,974 | 1/1969 | Wiener | 428/480 |
| 3,484,339 | 12/1969 | Caldwell | 428/480 |

OTHER PUBLICATIONS

*Hackh's Chemical Dictionary,* Fourth Edition, McGraw-Hill Book Co., p. 697.

*Primary Examiner*—George F. Lesmes
*Assistant Examiner*—P. J. Thibodeau
*Attorney, Agent, or Firm*—Connolly and Hutz

[57] ABSTRACT

X-ray intensifying screen comprising a flexible support of polyethylene terephthalate an adhesive layer and a fluorescent layer in which the adhesive layer contains a polyester or copolyester of isophthalic acid with aliphatic diols, optionally in combination with saturated dicarboxylic acids, and Turkey red oil.

8 Claims, No Drawings

ADHESIVE LAYER FOR X-RAY INTENSIFYING SCREENS ON POLYETHYLENE TEREPHTHALATE SUPPORT LAYERS

This invention relates to an X-ray intensifying screen containing a polyethylene terephthalate support layer which is covered with an intermediate layer to improve the adherence of the fluorescent layer which contains binder.

X-ray intensifying screens for medical and industrial radiography generally consist of the following layers:

a rigid or flexible support layer consisting e.g. of cardboard or a foil of polyethylene terephthalate, cellulose acetate, polyvinyl chloride or a copolymer of vinyl chloride/vinyl acetate and other polymers;

an adhesive layer containing a binder such as a vinyl chloride copolymer, polyvinyl butyral, chlorosulphonated polyethylene or a similar polymer;

optionally an additional reflective or radiation absorbent layer containing pigments such as titanium dioxide, magnesium oxide, barium sulphate or carbon black together with the same binder as in the adhesive layer or a similar binder;

a fluorescent layer containing fluorescent substances such as calcium tungstate; zinc sulphite; zinc cadmium sulphite; lead barium sulphate; a rare earth metal compound or a mixture of such compounds in a binder, and a transparent layer as protection against dirt and mechanical damage.

The use of rigid support layers has recently been abandoned in favour of flexible foils, in particular polyester foils, in order to obtain screens which will lie flatter and have better dimensional stability.

The fluorescent layers of conventional intensifying screens generally have a thickness of between about 50 and 300 μ while the thickness of the foils used as support layers is about 250 μ. The relatively thick fluorescent layers cannot be bonded sufficiently firmly to flexible supports, in particular to polyester supports, by means of the known adhesive substances.

Although it is known to use polyesters based on isophthalic acid, terephthalic acid, ethylene glycol and butane diol as binders in adhesive layers from photographic silver halide gelatine emulsion layers, the bond obtained with those polymers is much too weak for practical purposes when used in the adhesive layer of intensifying screens in which the fluorescent layers normally have a thickness of from 50 to 300 μ. The difficulty is not overcome by the addition of wetting agents or plasticisers such as fatty acid esters; polyoxyethylene phosphoric acid esters; electroneutral salts of polycarboxylic acids with amine derivatives; isotridecanol polyglycol ethers; castor oil; paraffin oil; trioleine; oleic acid or dibutyl phthalates.

It is an object of this invention to provide an X-ray intensifying screen in which the adhesive layer bonds the fluorescent layer more firmly to the support.

The problem is reduced or substantially solved in an X-ray intensifying screen consisting of a flexible support layer of polyethylene terephthalate with an adhesive layer, optionally a reflective or radiation absorbent layer, a fluorescent layer and optionally, a protective layer, and which is characterised in that the binders in the adhesive layer are polyesters or copolyesters of isophthalic acid with aliphatic diols, optionally in combination with saturated dicarboxylic acids, with a molecular weight of at least 4500, and 2 to 35% by weight of sulphonated castor oil, based on the dry weight of binder.

Examples of polyesters of isophthalic acid and diols and of copolyesters of isophthalic acid with other saturated dicarboxylic acids and aliphatic diols which may be used according to the invention as binders for the adhesive layer include polyesters of isophthalic acid and diols such as ethylene glycol; butane-1,4-diol; neopentyl glycol or hexane-1,6-diol; copolyesters of isophthalic acid; ethylene glycol and hexane-1,6-diol; copolyesters of isophthalic acid, ethylene glycol and neopentyl glycol; copolyesters of isophthalic acid, terephthalic acid, ethylene glycol and butane-1,4-diol and copolyesters of isophthalic acid, sebacic acid and ethylene glycol. Excellent results are obtained with a copolyester of isophthalic acid, terephthalic acid, ethylene glycol and butane-1,4-diol, in which the acid component consists of 70% by weight of isophthalate and 30% by weight of terephthalate groups. Esters with an isophthalate content of from 35 to 75% by weight are generally preferred.

The polyesters or copolyesters used in the material according to the invention are either commercial products, for example the isophthalic acid ester mentioned above which is obtainable from Goodyear under the name Vitel PE 200, or they can easily be prepared by well-known polycondensation processes.

The preparation of a polyester of isophthalic acid and neopentyl glycol will serve as example: 29.1 g of dimethylisophthalate and 41.6 g of neopentyl glycol together with 3 mg of zinc acetate, 6 mg of antimony trioxide and 6 mg of antimony trioxide and 6 mg of methyl orthotitanate are heated to 282° C under nitrogen for 2 hours and the resulting methyl alcohol is distilled off. The reaction mixture is then condensed in a vacuum of between 2.5 and 20 mmHg at 282° C for 4 hours. The polyester has an intrinsic viscosity of 0.20 dl/g determined in tetrachloroethane at 25° C.

The molecular weight of the polyesters and copolyesters used as binders in the adhesive layers according to the invention should be at least 4500. Suitable solvents for preparing the dispersions which are to be cast include chlorinated hydrocarbons such as chlorobenzene, dichloromethane or dichloroethane; ketones such as methyl ethyl ketone; esters such as methyl glycol acetate, methyl acetate or ethyl acetate; tetrahydrofuran, cyclohexanone or mixtures of xylene or toluene with alcohols; e.g. with isopropyl alcohol.

The surprisingly advantageous effect of the adhesive layers according to the invention is achieved by the addition of Turkey red oil to the composition of the adhesive layer. So-called Turkey red oil available commercially is a castor oil which has been treated with sulphuric acid and contains sulphonic acid esters in which the OH-group of ricinoleic acid is esterified with sulphuric acid. The Turkey red oil is added to the composition of the adhesive layer in a quantity of from 2 to 35% by weight, preferably 8 to 15% by weight, based on the dry weight of the polyester.

The casting properties of the adhesive layer composition containing Turkey red oil may be improved by the addition of wetting agents. Suitable wetting agents which do not impair the action of the Turkey red oil include, for example, fatty acid esters, isotridecanol-polyglycol ethers and alkyl phenol-polyoxyethylene condensates.

Reflective or radiation absorbent substances may also be added to the adhesive layer composition according to the invention without impairing the advantageous properties of the adhesive layer. Substances which may be used for this purpose, include for example, titanium dioxide; magnesium oxide; barium sulphate; calcium carbonate; magnesium carbonate and carbon black.

This possibility of embedding absorbent and reflective substances in the adhesive layer constitutes another interesting advantage of the intensifying screen according to the invention since it was previously necessary, when using the conventional binders for such adhesive layers, such as partially hydrolysed polyvinyl chloride/polyvinyl acrylates, alkyl acrylates; polyvinyl butyral or chlorosulphonated polyethylene, to incorporate the reflective or radiation absorbent substances in a separate layer outside the adhesive layer.

The adhesive layers according to the invention may be applied to the support layers in a thickness of from 1 to 2 μ but when they function also as reflective and radiation absorbent layers they are required to have a thickness of between about 10 and 30 μ in order to develop the required action.

The support layers are the conventional flexible polyethylene terephthalate supports conventionally used for X-ray intensifying screens, generally with a thickness of from 100 to 250 μ.

The adhesive layers according to the invention may be applied to the support layers by any of the methods known for this purpose.

Suitable binders for the fluorescent layers applied to the adhesive layer include, for example, polymers such as cellulose acetates or nitrates; alkyl acrylates and methacrylates and vinyl chloride copolymers, used separately or as mixtures. Binders which are soluble in alcohol, aliphatic ketones or acetic esters are preferred, for example copolymers of vinyl chloride/vinyl acetate alkyl acrylates and alkyl methacrylates which have 1 to 6 carbon atoms in the alkyl group.

Dispersion of the fluorescent substances may be carried out e.g. in alcohols (ethyl, propyl or butyl alcohol), aliphatic ketones such as acetone or methyl ethyl ketone and esters such as ethyl or butyl acetate together with diluents such as benzene or toluene.

The fluorescent substances are the usual pigments used for this purpose, e.g. zinc sulphide; zinc cadmium sulphide; calcium tungstate; lead barium sulphate and rare earth metal compounds. Application of the fluorescent layer to the adhesive layer may be carried out by the same methods as those used for the preparation of the adhesive layer.

Finally, the fluorescent layer may be covered with a protective coating of cellulose triacetate or polymethacrylate used either alone or in combination with polyvinyl chloride/polyvinyl acetate copolymers.

One particularly interesting advantage of intensifying screens which are prepared in accordance with the invention lies in the possibility of recovering the relatively expensive fluorescent materials from manufacturing scrap or from foils which have been badly cast. Recovery of fluorescent substances was previously achieved by ashing the materials containing them and then extracting the fluorescent substances, if necessary after removal of other pigments such as titanium dioxide. Since the binder-containing fluorescent layer of the intensifying screen according to the invention is soluble in alcohol and acetone, which do not dissolve the polyester binder of the adhesive layer but merely cause it to swell or coagulate on the surface, the differing solubilities of the binders can be utilised for recovering the fluorescent materials directly. If, for example, the intensifying screen prepared according to example 1 is immersed in a 2:8 mixture of methanol/acetone, 90 to 95% of the fluorescent material dissolves in only a few minutes, leaving behind the support layer with the adhesive layer which may possibly contain inorganic pigments. When the support layer has been dried, it can again be cast with a layer of fluorescent substances. This method of regeneration is simple and inexpensive compared with the methods previously employed.

The invention will now be explained more fully with the aid of the following examples:

EXAMPLE 1

A polyethylene terephthalate foil 250 μ in thickness was coated with an adhesive layer of the following composition by the immersion process:

4,000 g of a 25% solution of the above described copolyester of isophthalic acid, terephthalic acid, ethylene glycol and butane-1,4-diol in chlorobenzene and ethyl acetate (1:1);
50 g of oleic acid glyceric ester;
50 g of Turkey red oil and
6,500 g of chlorobenzene.

The dispersion was milled in a ball mill for 96 hours, diluted with a mixture of chlorobenzene and ethyl acetate in proportions by weight of 1:1, filtered through a filter with a pore size of 0.001 to 0.005 mm and applied.

The thickness of the dry layer was 2 μ. A fluorescent layer of the following composition was applied to the adhesive layer:

10,000 g of calcium tungstate;
2,000 g of ethyl acetate;
800 g of cellulose acetobutyrate;
280 g of polyethyl acrylate;
200 g of toluene;
100 g of methyl glycol acetate and
1,600 g of methyl ethyl ketone.

The thickness of the calcium tungstate layer when dry was 200 μ. The bond between the layers obtained was very firm but was insufficient if no Turkey red oil was added to the adhesive layer of otherwise the same composition. The bond strength was tested by the following method:

The samples were stored for 4 weeks at 25° C and a relative humidity of 60%. The layer was cut down to the substrate with a razor blade to form 5 rows of squares with a length of side of 2 mm, with 10 squares to each row. An adhesive tape was pressed down on the cut surface with a ruler and one loose end of the tape was gripped and held at an angle of 90° to the surface of the layer. The tape was suddenly pulled upwards. The number of squares left on the substrate is a measure of the bond strength.

EXAMPLE 2

Example 1 was repeated but in this case the adhesive layer served as reflective layer and had the following composition:

13,000 g of a 25% solution in a 1:1 mixture of chlorobenzene and ethyl acetate of the copolyester used in the adhesive layer of Example 1;
6,000 g of chlorobenzene;
300 g of oleic acid glyceric ester;
300 g of Turkey red oil and
10,000 g of titanium dioxide.

After the dispersion had been milled in a ball mill for 48 hours, it was applied to a 250 μ polyethylene terephthalate foil to form a 20 μ layer on it. The fluorescent layer described in Example 1 was then cast on it.

EXAMPLE 3

The method described in Example 2 for preparing the intensifying screen was repeated, but in this case 8000 g of barium sulphate were added to the adhesive layer instead of titanium dioxide.

EXAMPLE 4

Example 2 was repeated except that the adhesive layer was applied as a light absorbent layer which had the following composition:

2,500 g of a 20% solution in chlorobenzene of the copolyester used in the preceding examples;
40 g of oleic acid glyceric ester;
70 g of Turkey red oil;
40 g of carbon black and
500 g of chlorobenzene.

The thickness of the layer when dry was 30 μ.

The results obtained in Examples 2 to 4 when the bond strength was tested were comparable to that of Example 1. When the tearing test described in Example 1 was carried out the intensifying screens prepared according to Examples 1 to 4 retained 100% of their squares whereas only 40 to 60% of the squares were retained on comparison samples which did not contain Turkey red oil.

EXAMPLE 5

Example 1 was repeated except that the Turkey red oil in the adhesive layer was replaced by an equal quantity of castor oil.

In the tearing test only 38% of the squares were left on the substrate.

EXAMPLE 6

In the composition of adhesive layer used in Example 1, the copolyester was replaced by one of the following polymers:

| | | |
|---|---|---|
| 1. | Polyneopentyl isophthalate | 3,800 g |
| 2. | Copolyester of isophthalic acid, alkylene glycol (30 % by weight) and hexane-1,6-diol (10 % by weight) | 4,200 g |
| 3. | Copolyester of isophthalic acid, sebacic acid and ehtylene glycol (molar ratio 1:1:1) | 4,000 g |

-continued

The procedure was otherwise the same as described in Example 1. From each of the three adhesive layers, one sample was processed with the addition of Turkey red and another without this additive.

The results of the tearing out test described in Example 1 are shown in the following table:

| | Adhesive layer with additive | Adherence without additive |
|---|---|---|
| 1. | 100 % | 40 % |
| 2. | 100 % | 50 % |
| 3. | 100 % | 52 % |

We claim:

1. A laminate providing a screen for intensifying in x-ray radiography comprising a flexible polyethylene terephthalate support layer, an adhesive layer and a fluorescent layer wherein the improvement comprises the binder in the adhesive layer consists of polyesters or copolyesters having an isophthalate content in the polyester of 30–75% by weight with at least one aliphatic diol; and 2–35% by weight of sulfonated castor oil based on the dry weight of the binder.

2. The laminate as claimed in claim 1 wherein the polyester of the binder of the adhesive layer is polyneopentyl glycol isophthalate.

3. The laminate as claimed in claim 1 wherein the polyester of the binder of the adhesive layer is a copolyester of isophthalic acid, ethylene glycol and hexane-1,6-diol.

4. The laminate as claimed in claim 1 wherein the polyester of the binder of the adhesive layer is a copolyester of isophthalic acid, terephthalic acid, ethylene glycol and butane-1,4-diol.

5. The laminate as claimed in claim 1 wherein the polyester of the binder consists of a copolyester of isophthalic acid, sebacic acid and ethylene glycol.

6. The laminate as claimed in claim 1 wherein the adhesive layer contains reflective or radiation absorbent substances selected from the group consisting of titanium dioxide, magnesium dioxide, barium sulphate, calcium carbonate, magnesium carbonate or carbon black.

7. The laminate as claimed in claim 1 wherein the binder of the fluorescent layer consists of polymers which are soluble in alcohol, aliphatic ketones or acetic esters.

8. The laminate as claimed in claim 1 wherein the binder of the fluorescent layer consists of copolymers of vinyl chloride/vinyl acetate and/or alkyl acrylates or methacrylates in which the alkyl groups contain 1 to 6 carbon atoms.

* * * * *